Figure 1:
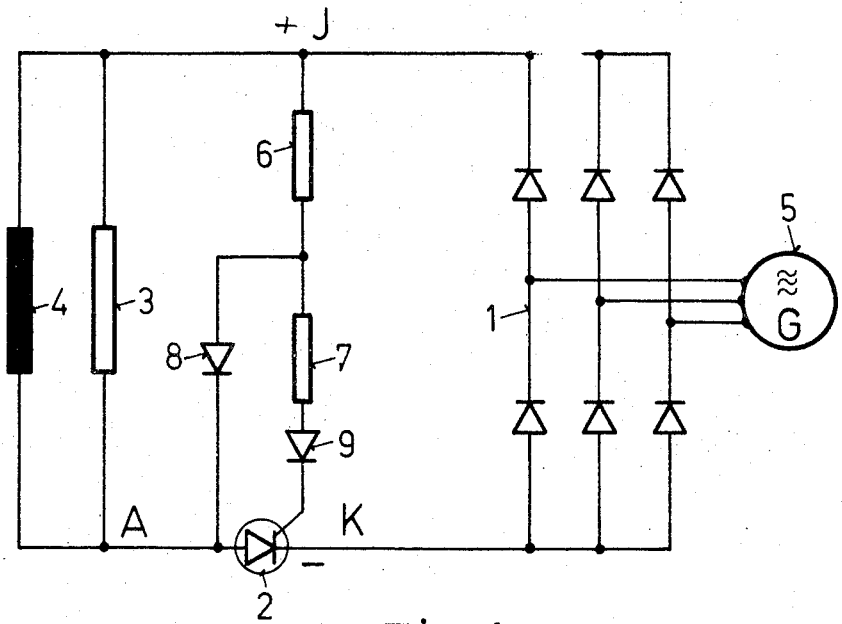

United States Patent [19]
Canay

[11] 3,793,572
[45] Feb. 19, 1974

[54] ELECTRONIC CIRCUIT FOR EXCITING ASYNCHRONOUS-START SLIPRINGLESS SYNCHRONOUS MOTORS

[75] Inventor: Muzaffer Canay, Birr, Switzerland

[73] Assignee: Brown Boveri & Company Limited, Baden, Switzerland

[22] Filed: May 22, 1973

[21] Appl. No.: 362,775

[30] Foreign Application Priority Data
June 26, 1972   Switzerland.......................... 9567/72

[52] U.S. Cl................. 318/174, 318/176, 318/181, 318/183, 318/193
[51] Int. Cl. ............................................. H02p 1/50
[58] Field of Search ... 318/167, 174, 176, 181, 183, 318/193

[56] References Cited
UNITED STATES PATENTS

| | | | |
|---|---|---|---|
| 3,463,987 | 8/1969 | Schlicher et al. .................... | 318/176 |
| 3,509,439 | 4/1970 | Schicht .............................. | 318/183 |
| 3,599,236 | 8/1971 | Hutchins............................ | 318/176 |
| 3,667,014 | 5/1972 | Merhof et al. ................. | 318/193 X |

Primary Examiner—Gene Z. Rubinson
Attorney, Agent, or Firm—Pierce, Scheffler & Parker

[57] ABSTRACT

In order to excite the field winding on the rotor of an asynchronous-start synchronous motor which has a resistor connected in parallel with the winding, the alternating current output from an exciter winding mounted on the rotor shaft is converted in a rectifier bridge of the semiconductor type also mounted on the rotor shaft and fed to the field winding through a direct current circuit which includes a thyristor for interrupting the flow of direct current to the field winding when the motor is operating in its asynchronous state. For this purpose, a pair of series-connected resistors extend between the positive side of the rectifier bridge and the control electrode of the thyristor, and a diode has its anode side connected to the junction between the series-connected resistors and its cathode side connected to the negative side of the rectifier bridge. The thyristor for interrupting current flow from the rectifier bridge to the field winding can either be an auxiliary thyristor unit, in which case the semiconductor elements of the rectifier bridge can consist entirely of uncontrolled diodes, or the function of the thyristor in disconnecting flow of direct current to the field winding can be performed by so constructing the rectifier bridge that uncontrolled diodes make up the positive half of the bridge and thyristors the negative half.

8 Claims, 2 Drawing Figures

ELECTRONIC CIRCUIT FOR EXCITING ASYNCHRONOUS-START SLIPRINGLESS SYNCHRONOUS MOTORS

This invention relates to an improvement in a known electronic circuit for exciting asynchronous-start slipringless synchronous motors, wherein the rotating winding of an alternating current exciter armature mounted on the shaft of the synchronous motor is connected by way of a co-rotating rectifier bridge connection to the rotating field winding provided in the synchronous motor and having at least one parallel resistor, and wherein controlled converter valves are provided for the temporary separation of the rectifier bridge connection from the field winding in the asynchronous state.

In a known circuit arrangement possessing these basic features the co-rotating rectifier bridge circuit is in the form of a "semi-controlled bridge" with thyristors in one half of the bridge and uncontrolled diodes in the other half. For the control of the thyristors, a control device is provided which is likewise fed by the armature winding of the exciter and which consists of a second rectifier bridge connection having only uncontrolled diodes. The control device is fed from the armature winding by way of an isolating transformer. Here the starting resistor, which is connected in parallel to the field winding, always remains connected even in normal synchronous operation, and thus gives rise to increased excitation losses. During asynchronous starting, the thyristors remain blocked, so that the entire starting current in the field circuit flows through this resistor in both directions.

In another known arrangement, the rectifier bridge circuit comprises uncontrolled diodes. During normal synchronous operations, the current coming from the diode bridge flows through a main thyristor, which is then fired. Two auxiliary thyristors, which are connected in series in the same direction and which are not fired in normal operation, are connected in anti-parallel to the diode bridge. During asynchronous starting, these auxiliary thyristors nevertheless become conductive, so that the magnet wheel (rotor) current can flow in one direction through the diode bridge and in the opposite direction through the auxiliary thyristors. On the other hand, the main thyristor cannot fire without excitation during asynchronous starting, and therefore a starting resistor in parallel to it comes into action in the field circuit during starting. All three thyristors are power thyristors.

Three power transistors are also contained in a third known circuit arrangement having an uncontrolled diode bridge, namely a main thyristor for rated exciter current from the diode bridge to the field winding and two anti-parallel auxiliary thyristors, connected in series with a resistor, in a branch in parallel to the field winding. All three power thyristors are controlled by a co-rotating control unit.

The above-mentioned circuits have certain disadvantages of which, in the case of the last-mentioned arrangement, only the complicated control unit will be mentioned. In addition, not only in this arrangement but also in the second circuit arrangement three power thyristors are necessary, while finally in both circuits, the switching-on of the excitation in dependence on the position or polarity of the rotor is necessary, that is to say provision must be made for special monitoring of the magnet wheel (rotor) current. In the second circuit arrangement described above, moreover, a relatively high permanent grid current flows in the main thyristor during normal operation. Although the arrangement mentioned first above permits higher powers than the other two arrangements, and although it permits the switching-on of the excitation independently of the position of the rotor, nevertheless it requires a control device consisting of a diode rectifier bridge and also a fairly expensive isolating transformer.

The invention seeks to avoid the disadvantages of the known arrangements. According to the invention this is achieved in an electronic excitation circuit arrangement of the type first described above by disposing on the negative side of the rectifier bridge connection, and in the direct current circuit of the latter, the anode-cathode section — which in relation to the rectifiers is forward-biased — of at least one thyristor, one pole of which is connected to one terminal of the parallel resistor, while the other parallel resistor terminal, which is connected to the rectifier bridge pole not on the thyristor side, is connected, through the series connection of two resistors, to the control electrode of the aforesaid thyristor — at least one such thyristor being provided, while the interconnection point of the two series resistors is connected by way of a forward-biased diode to the anode of this thyristor.

The invention is explained more fully below with the aid of FIGS. 1 and 2, in which:

FIG. 1 shows an example of embodiment with an uncontrolled diode bridge, and

Figure 2:
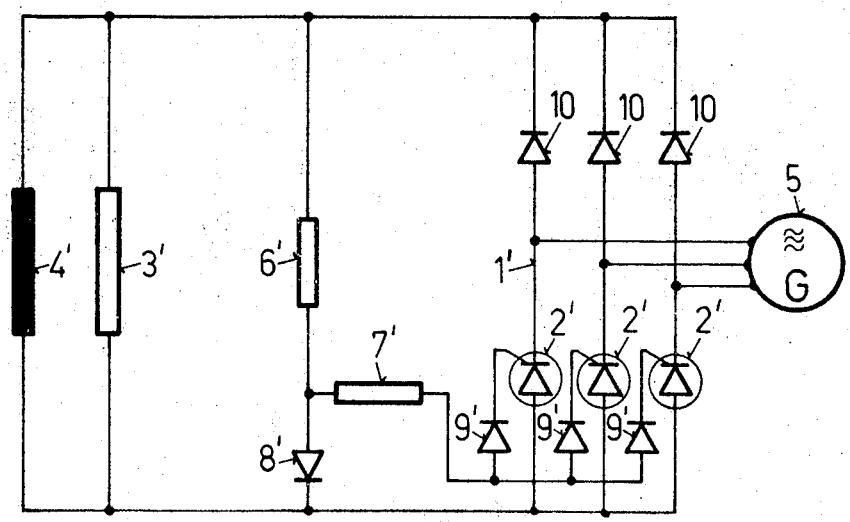

FIG. 2 a further development with a self-switching thyristor-diode bridge.

In the circuit arrangement illustrated in FIG. 1 the rectifier bridge 1, which is in the form of a conventional uncontrolled diode bridge, is connected in series with a thyristor 2. 3 is the resistor which is known per se and is in parallel to the field winding 4, and 5 the three-phase armature winding of the exciter. From the positive pole J of the diode bridge 1 a connection is made by way of the series resistors 6 and 7 and of the forward-biased diode 9 to the control electrode (the grid) of the thyristor 2.

In normal synchronous operation, during which the potential of the bridge pole J is higher than that at K, at the cathode side of thyristor 2 a grid current flows through the firing resistors 6 and 7, so that the thyristor 2 fires and becomes conductive. Resistors 6 and 7 have a very high resistance value in relation to that of the starting resistor 3. According to the same principle, that is to say, by means of a firing resistor, the main thyristor in the known circuit arrangement, of the second kind discussed previously, is also fired. After the firing, however, the grid current persists in that case and causes losses, which with rising exciter voltage rapidly reach the maximum permissible value. If in FIG. 1 the diode 8 is imagined to be removed and if the firing resistance (6 + 7) is increased so that the grid current at the rated excitation becomes smaller, there is a danger that the thyristor will no longer fire at all at low exciter voltage. According to the invention the interconnection point of the firing resistors 6 and 7 is now connected by way of the previously mentioned forward-biased diode 8 to the anode of the thyristor 2. With the thyristor 2 non-conductive, resistor 7 is then fully effective. As soon as thyristor 2 fires and becomes conductive, the diode 8 however practically short-circuits this resistor 7. Consequently, the grid current is reduced to a minimum, in accordance with the approximately constant voltage drop at this diode. This very low permanent grid current consequently does not vary to any considerable extent when the exciter voltage is raised.

During asynchronous starting, the field current flows during the negative half-wave (potential of J higher than that at A at the anode side of thyristor 2) through the starting resistor 3, because of the blocking by the diode bridge. During the positive half-wave (potential at A higher than that at J) thyristor 2 remains blocked, since it receives no grid current at all. Thus, the current induced in the field winding 4 always flows through the resistor 3. As soon as the motor is excited (that is to say the potential at J is higher than that at K), thyristor 2 becomes conductive and the motor becomes synchronized. The excitation then automatically builds up only during the positive half-wave, even if it is switched on during the negative half-wave. The excitation can therefore be switched on at any desired time and at any arbitrary slip value, and no relay is needed to pick up the positive half-wave, as is the case in the second and third solutions discussed above. The proposed circuit arrangement according to FIG. 1 therefore does not differ in respect of its behavior from conventional synchronous motors but, in contrast to the latter, requires no sliprings or brushes.

In relation to the second and third known circuit arrangements described above, the arrangement according to FIG. 1 has the additional advantage of relatively simple construction with only one power thyristor (whereas in the known circuits referred to, two thyristors are additionally required for one and the same motor power).

The second diode 9 in the grid circuit is not of primary importance for the correct functioning of the circuit arrangement. It is, however, advisable in practice, in order to avoid undesired negative grid currents (anode-grid), which sometimes occur at high slip values, when the thyristor 2 is conductive.

A certain disadvantage of the circuit arrangement shown in FIG. 1 is that, as in the case of the second and third arrangements previously discussed, its applicability depends on the power of the thyristor. Adaptation to higher motor power is, however, possible if, in accordance with a further development of the invention, a plurality of thyristors, for example three, are connected with their anode-cathode section in parallel and are controlled conjointly. In this arrangement there is only one first diode 8, which lies between the connection point of the resistors 6, 7 and the interconnected anodes of the parallel thyristors. When diodes 9 are used between the firing resistor 7 and the thyristor grid, a separate diode 9 should be provided for each of the parallel thyristors.

In a further development of the invention, the thyristors may so-to-speak be "integrated" in the rectifier bridge 1, that is to say some of the uncontrolled diodes of the latter, particularly the diodes of the negative half of the bridge, may be replaced by these thyristors 2'. The resulting circuit arrangement with a "self-switching thyristor-diode bridge" is illustrated in FIG. 2. Here again only a single diode 8', which is common to all three thyristors, is required between the connection point of the resistors and the negative pole of the bridge, which corresponds to the interconnection point of the three thyristor anodes. The other terminal of the second firing resistor is here preferably connected by way of separate small diodes 9' similar to the diode 9 in FIG. 1, to the control electrode of each thyristor 2'. Thus, the thyristors can, without hindrance, apply their full blocking voltage during the blocking period. With very low alternating voltages of the exciter, it is, however, here again possible to dispense with these diodes.

In connection with the mode of operation of the arrangement shown in FIG. 2, it is pointed out that, as soon as the synchronous machine is excited, the thyristor 2' whose cathode has the lowest negative potential will fire first, because the grid potential is already positive in all the thyristors. After the firing of the first thyristor, the common grid circuit is brought by the diode 8' to a potential which, because of the practically constant voltage drop of the diode 8', is about 1 volt higher than the common anode potential. Apart from this difference of 1 volt, the grids and the anodes thus have the same potential. If the cathode potential $V_K$ of a thyristor 2', which is not yet conductive, is lower than the common anode potential $V_A$, this thyristor will automatically fire. In normal synchronous operation with excitation, the thyristors in this arrangement are self-firing, that is to say they behave as diodes. The bridge therefore does not differ from the conventional diode bridge.

During asynchronous starting, the pole wheel induced field current is blocked by the thyristors 2' during the negative half-wave and flows through the resistor 3'. During the positive half-wave, the thyristors 2' are unable to fire until synchronization, that is to say until excitation, is introduced, because the diode 8' is blocked during this half-wave, that is to say it has a resistance which is also very high in relation to that of the firing resistors 6', 7'. The grid potential accordingly corresponds substantially to the potential, which at this moment is negative, of the terminal of field winding 4' connected to the cathodes of the uncontrolled diodes 10 of the rectifier bridge 1. Thus, no grid current flows and the bridge remains blocked.

In the circuit arrangements proposed according to the invention, the possible dispersion of the thyristor firing characteristics presents no difficulty. The dimensioning of the firing resistors 6,7 presents no problem since they have only protective functions. They do not need to be adapted to each machine.

In the circuit arrangements illustrated in the drawings, the thyristors naturally do not receive any grid current at all in the blocking phase. This is a great advantage over externally controlled thyristor circuit arrangements in which extremely disagreeable and disturbing currents or signals may occur when the signals arrive during the blocking period in consequence of an error.

I claim:

1. In an arrangement for exciting the rotatable field winding of an asynchronous-start synchronous motor, the combination comprising an exciter having an alternating current output winding mounted on the rotor shaft of said synchronous motor for rotation therewith, a resistor connector in parallel with said field winding, a rectifier bridge of the semiconductor type also mounted on said rotor shaft for rectifying the alternating current output of said exciter and delivering direct current to said parallel-connected field winding and resistor, thyristor means connected into the negative side of said rectifier bridge for interrupting the flow of direct current to said field winding when said motor is operating in its asynchronous state, first and second resistors connected in series between the positive side of said rectifier bridge and the control electrode of said thyristor means, and a diode having its anode side connected to the junction between said series-connected resistors and its cathode side connected to the anode side of said thyristor means.

2. An arrangement for exciting the field winding of asynchronous motor as defined in claim 1 wherein said rectifier bridge is composed entirely of uncontrolled diodes and said thyristor means is constituted by a thyristor connected to the uncontrolled diodes in the negative side of the bridge.

3. An arrangement for exciting the field winding of a synchronous motor as defined in claim 1 wherein the positive half of said rectifier bridge is composed of uncontrolled diodes and the negative half of thyristors, the control electrodes of said thyristors being connected through said series-connected resistors to the positive side of said rectifier bridge.

4. In an arrangement for exciting the rotatable field winding of an asynchronous-start synchronous motor, the combination comprising an exciter having an alternating current output winding mounted on the rotor shaft of said synchronous motor for rotation therewith, a resistor connected in parallel with said field winding, a rectifier bridge of the semiconductor type also mounted on said rotor shaft for rectifying the alternating current output of said exciter and delivering direct current to said parallel-connected field winding and resistor, a thyristor connected between one end of said resistor and the negative side of said rectifier bridge and which is poled to conduct current in the direction toward said bridge, first and second resistors connected in series between the positive side of said rectifier bridge and the control electrode of said thyristor and a diode connected at its anode side to the junction between said series-connected resistors and the anode side of said thyristor.

5. An arrangement for exciting the field winding of a synchronous motor as defined in claim 4 wherein said rectifier bridge is composed of uncontrolled diodes, the cathode of said thyristor being connected to the anode sides of the diodes in the negative half of said rectifier bridge and the anode of said thyristor being connected to the corresponding end of said resistor which is paralleled with said field winding.

6. An arrangement for exciting the field winding of a synchronous motor as defined in claim 5 wherein a plurality of said thyristors are provided with their anode-cathode sections connected in parallel and the cathode side of said diode whose anode is connected to the junction between said resistors extends to the anodes of all of said thyristors.

7. An arrangement for exciting the field winding of a synchronous motor as defined in claim 4 and which further includes a second diode having its anode side connected to one end of said second resistor and its cathode connected to the control electrode of said thyristor.

8. In an arrangement for exciting the rotatable field winding of an asynchronous-start synchronous motor, the combination comprising an exciter having an alternating current output winding mounted on the rotor shaft of said synchronous motor for rotation therewith, a resistor connected in parallel with said field winding, a rectifier bridge of the semiconductor type also mounted on said rotor shaft for rectifying the alternating current output of said exciter and delivering direct current to said parallel-connected field winding and resistor, the positive half of said rectifier bridge being composed of uncontrolled diodes and the negative half of thyristors, first and second resistors connected in series between the positive side of said rectifier bridge and the control electrodes of said thyristors, and a diode having its anode side connected to the junction between said series-connected resistors and its cathode side connected to the anode sides of said thyristors.

* * * * *